(12) United States Patent
Platts

(10) Patent No.: US 7,159,360 B2
(45) Date of Patent: Jan. 9, 2007

(54) PET VENTILATION WINDOW

(76) Inventor: James W. Platts, 22132 E. Alamo La., Centennial, CO (US) 80015

( * ) Notice: Subject to any disclaimer, the term of this patent is extended or adjusted under 35 U.S.C. 154(b) by 8 days.

(21) Appl. No.: 10/738,885

(22) Filed: Dec. 17, 2003

(65) Prior Publication Data

US 2005/0132651 A1   Jun. 23, 2005

(51) Int. Cl.
*E06B 3/68* (2006.01)

(52) U.S. Cl. ............................. 49/57; 49/463

(58) Field of Classification Search .............. 49/50, 49/57, 61, 463; 296/95.1, 146.1; 454/131, 454/133; 160/180
See application file for complete search history.

(56) References Cited

U.S. PATENT DOCUMENTS

| | | | | |
|---|---|---|---|---|
| 1,584,910 A | * | 5/1926 | Volker ...................... | 160/40 |
| 1,721,223 A | * | 7/1929 | Kern .......................... | 49/48 |
| 2,715,866 A | * | 8/1955 | Mousel ...................... | 454/132 |
| 3,032,351 A | * | 5/1962 | Lewis, Jr. .................. | 280/748 |
| 4,409,758 A | * | 10/1983 | Dickerson et al. .......... | 49/463 |
| 4,730,413 A | * | 3/1988 | Henry ........................ | 49/48 |
| 4,932,454 A | * | 6/1990 | Swope ...................... | 160/105 |
| 5,570,542 A | * | 11/1996 | Cameron ................... | 49/463 |
| 5,594,193 A | * | 1/1997 | Sheridan ................... | 89/36.08 |
| 6,192,628 B1 | * | 2/2001 | Pinheiro et al. ............ | 49/70 |
| 6,634,407 B1 | * | 10/2003 | Strohmeyer ................ | 160/180 |
| 6,968,648 B1 | * | 11/2005 | Bourque et al. ............ | 49/460 |

* cited by examiner

*Primary Examiner*—Jerry Redman
(74) *Attorney, Agent, or Firm*—John L. Isaac

(57) ABSTRACT

A pet ventilation panel for a vehicle window opening is disclosed. The vehicle window opening is typically defined by a retractable windowpane movable within a window frame having upper, lower and opposed side frame members. The ventilation panel includes a selectively removable window insert formed from a single sheet of material. The insert has an upper edge adapted for engagement with an upper frame member of a vehicle window frame, and side edges adapted for engagement with side frame members of the vehicle window frame to cover at least a portion of the vehicle window opening. A central opening is defined by a continuous edge in the insert. The opening is sized and shaped to permit penetration thereof by the head of an animal disposed within the vehicle without permitting passage of the animal's body therethrough to prevent inadvertent escape from the vehicle by the animal. A mechanism is provided for maintaining the insert in position within the vehicle window opening. Finally, a border element covers the insert continuous edge which defines the central opening, the border element protecting the head and neck of an animal which penetrates the opening.

5 Claims, 4 Drawing Sheets

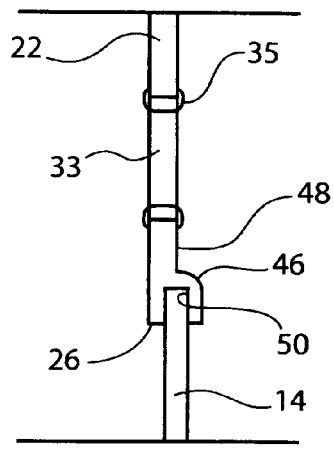
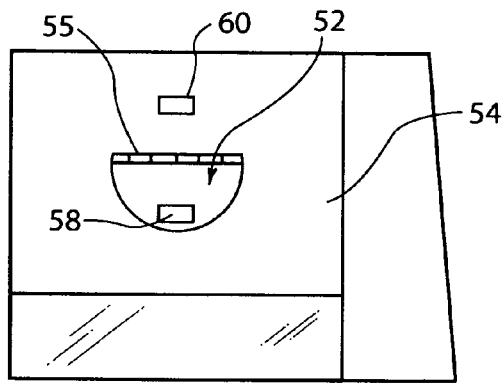
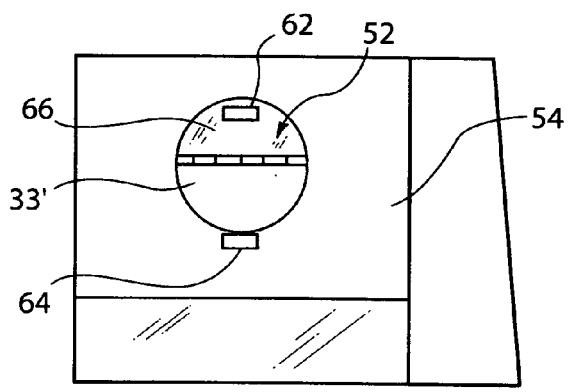
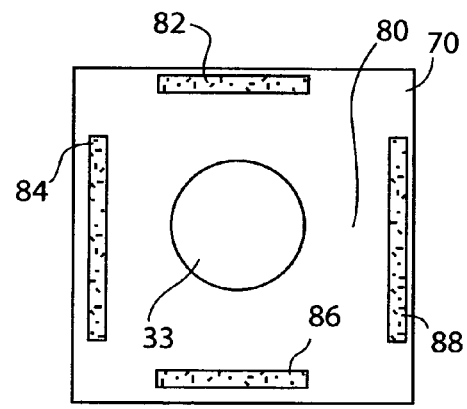
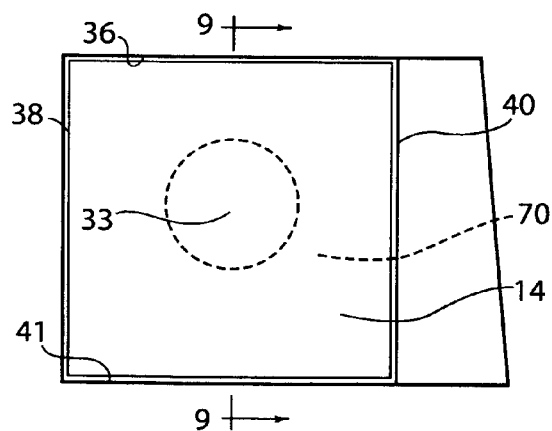

PET VENTILATION WINDOW

BACKGROUND OF THE INVENTION

1. Field of the Invention

The present invention relates generally to window ventilation systems for moving vehicles and, more particularly, to devices for installation in a car or truck window opening to permit interior ventilation for pets contained therein. Specifically, the present invention relates to such a window ventilation device that is removable and adapted to prevent pets from escaping the vehicle.

2. Description of the Prior Art

There are many situations when it is desirable to provide ventilation for the interior of a vehicle. Devices which attach to window frames of vehicles are quite common and are used to draw unwanted odors from the interior of the vehicle to the exterior thereof, while permitting air to circulate within the interior from the exterior of the vehicle. It is a common practice to open windows of a vehicle when driving or while the vehicle is parked so as to ventilate tobacco smoke, pet smells and other odors into the atmosphere while simultaneously admiting fresh ambient air into the vehicle interior. However, opening the vehicle window as the vehicle is in motion significantly affects aerodynamic qualities of the vehicle. Moreover, high vehicle speeds may cause excessive airflow into the vehicle.

As a result, many people prefer to use ventilation features available on the control panel of a vehicle to admit fresh air into the vehicle. While a vehicle fan functions adequately in many cases, it still often leaves undesirable odors in the vehicle, especially if the odors have penetrated the vehicle's interior fabric. Consequently, many people still prefer to open windows to allow airflow to enter the vehicle with a greater force. Examples of devices adapted for mounting to a vehicle window structure to permit airflow into a vehicle window are disclosed in U.S. Pat. Nos. 1,457,959, 1,592,667, 1,933,478, 2,557,442, 3,659,516, 3,743,001, 4,463,790, 4,546,693, 4,864,920, 5,570,542 and 6,042,473.

In addition to simple vehicle ventilation, owners of vehicles who also own animals for pets, particularly dogs, often transport the pets in the vehicle passenger compartment. At times, the vehicle owner may desire to leave a window open so that fresh air may enter the vehicle while traveling. Even with air conditioning, there are occasions when leaving the vehicle window open is preferable for the comfort of both the human driver and the animal. However, once the vehicle owner slows down for traffic or slows down and stops for traffic signals, the animal may jump out of an open window and escape the vehicle.

Moreover, there are times when the vehicle owner may wish to leave the vehicle unattended for periods of time and leave the animal inside the passenger compartment. This is particularly common when a vehicle owner makes shopping trips, since most stores do not allow pets to come in. In warm and hot climates, leaving an animal unattended in the passenger compartment of a vehicle can be dangerous to the animal because of rising temperatures in the passenger compartment. If the vehicle owner leaves the window open to permit ventilation, the animal can exit the vehicle through the open window. Opening the window only a small amount is also not a solution as insufficient air will enter the vehicle passenger compartment. As a result of the aforementioned problems, a number of devices have been created to allow air to enter a window opening while preventing a pet contained within the vehicle from escaping. Examples of such devices are illustrated in U.S. Pat. Nos. 4,854,364, 4,653,562, 5,829,388, 5,879,048, 5,768,827 and 6,192,628. Unfortunately, many of these devices are complicated to install and quite unsightly. Moreover, some are not particularly easily removable. Finally, many must in fact be removed if inclement weather should occur, a task which is quite difficult if the vehicle is in motion. Consequently, there remains a need for a simple and effective vehicle ventilation device which is easily removably installed into the window frame of the vehicle, which can be sealed from inclement weather without having to stop the vehicle and remove the device and which will prevent pet escape from the vehicle. The present invention addresses and solves this particular problem in the art.

SUMMARY OF THE INVENTION

Accordingly, it is one object of the present invention to provide a device to permit an animal contained within a vehicle to project their head out of a window without endangering the animal.

It is another object of the present invention to provide a pet ventilation device for insertion into the window opening of a vehicle yet prevent escape of the pet from the vehicle.

Yet another object of the present invention is to provide a device for ventilating the interior of a vehicle for a pet contained therein.

Still another object of the present invention is to provide an opening in a vehicle window which permits a pet to stick its head out of the window while still containing the pet inside the vehicle.

To achieve the foregoing and other objects and in accordance with the purpose of the present invention, as embodied and broadly described h rein, a pet ventilation panel for a vehicle window opening is disclosed. The vehicle window opening is typically defined by a retractable windowpane movable within a window frame having upper, lower and opposed side frame members. The ventilation panel includes a selectively removable window insert formed from a single sheet of material. The insert has an upper edge adapted for engagement with an upper frame member of a vehicle window frame, and side edges adapted for engagement with side frame members of the vehicle window frame to cover at least a portion of the vehicle window opening. A central opening is defined by a continuous edge in the insert. The opening is sized and shaped to permit penetration thereof by the head of an animal disposed within the vehicle without permitting passage of the animal's body therethrough to prevent inadvertent escape from the vehicle by the animal. A mechanism is provided for maintaining the insert in position within the vehicle window opening. Finally, a border element covers the insert continuous edge which defines the central opening, the border element protecting the head and neck of an animal which penetrates the opening.

In one modification of the invention, the position maintenance mechanism is a lower edge of the insert adapted for engaging a top edge of the retractable windowpane which defines the window opening. In one aspect of this modification, the insert lower edge is in the form of a substantially U-shaped notch sized and shaped to receive the windowpane top edge therein. In still another aspect, the insert lower edge includes a lip element projecting inwardly into the vehicle and which is adapted to receive the windowpane top edge therein.

In another modification of the invention, the insert further includes a cover member pivotally attached to the outer surface of the insert. The cover member is positioned to move between a first closure position overlaying and closing the central opening, and a second closure position unclosing and permitting access to the central opening. In one aspect, the cover member is in the form of a flap having first and second connection elements to maintain the flap in the first and second closure positions, respectively. In one aspect of this, the first and second connection elements comprise hook and loop fasteners disposed on the flap surfaces and the insert outer surface.

In still another form of the invention, the insert is adapted to engage the upper and side frame members of the vehicle window frame inwardly of the window opening to space the insert interiorly of the windowpane. In one aspect of this, the windowpane functions as a closure mechanism for the opening in the insert. In another aspect, the insert includes connection elements to maintain the insert in position spaced inwardly from the windowpane.

In another modification of the invention, a pet ventilation panel for a vehicle window opening is disclosed. The vehicle window opening is defined by a retractable windowpane movable within a window frame having upper, lower and opposed side frame members. The ventilation panel includes a selectively removable window insert formed from a single sheet of material to cover at least a portion of the vehicle window opening. The insert has an upper edge adapted for engagement within an upper frame member of a vehicle window frame, side edges adapted for engagement within side frame members of the vehicle window frame, and a lower edge adapted for engaging a top edge of the retractable window pane which defines the window opening. The lower edge forms a mechanism for maintaining the insert in position within the vehicle window opening. A central opening is defined by a continuous edge in the insert, the opening being sized and shaped to permit penetration thereof by the head of an animal disposed within the vehicle without permitting passage of the animal's body to prevent inadvertent escape from the vehicle by the animal. Finally, a border element covers the insert continuous edge which defines the central opening, the border element protecting the head and neck of an animal which penetrates the opening.

Still another modification of the invention is in the form of a pet ventilation panel for a vehicle window opening. The vehicle window opening is defined by a retractable windowpane movable within a window frame having upper, lower and opposed side frame members. The ventilation panel includes a selectively removable window insert formed from a single sheet of material to cover the vehicle window opening. The insert has an upper edge adapted for engagement inwardly of the window opening proximate an upper frame member of a vehicle window frame, side edges adapted for engagement inwardly of the window opening proximate side frame members of the vehicle window frame, and a lower edge adapted for engagement inwardly of the window opening proximate a bottom frame member of a vehicle window frame. The insert is spaced interiorly inwardly of the window pane, and a central opening is defined by a continuous edge in the insert. The opening is sized and shaped to permit penetration thereof by the head of an animal disposed within the vehicle without permitting passage of the animal's body to prevent inadvertent escape from the vehicle by the animal. Finally, a border element covers the insert continuous edge which defines the central opening, the border element protecting the head and neck of an animal which penetrates the opening.

BRIEF DESCRIPTION OF THE DRAWINGS

The accompanying drawings which are incorporated in and form a part of the specification illustrate preferred embodiments of the present invention and, together with a description, serve to explain the principles of the invention. In the drawings:

FIG. 4 is a cross-sectional view similar to that of FIG. 3 but illustrating an alternate mounting embodiment of the invention;

FIG. 5 is a front plan view of another embodiment of the invention in position in a vehicle window frame and illustrating a closure member in a closed position;

FIG. 6 is a front plan view similar to that of FIG. 5 but illustrating the closure member in an open position;

FIG. 7 is a front plan view of yet another embodiment of the present invention;

FIG. 8 is a front plan view of a vehicle window frame having the embodiment of FIG. 7 installed therein and the vehicle window in a fully closed position;

DETAILED DESCRIPTION OF THE EXEMPLARY EMBODIMENTS

Figure 1:
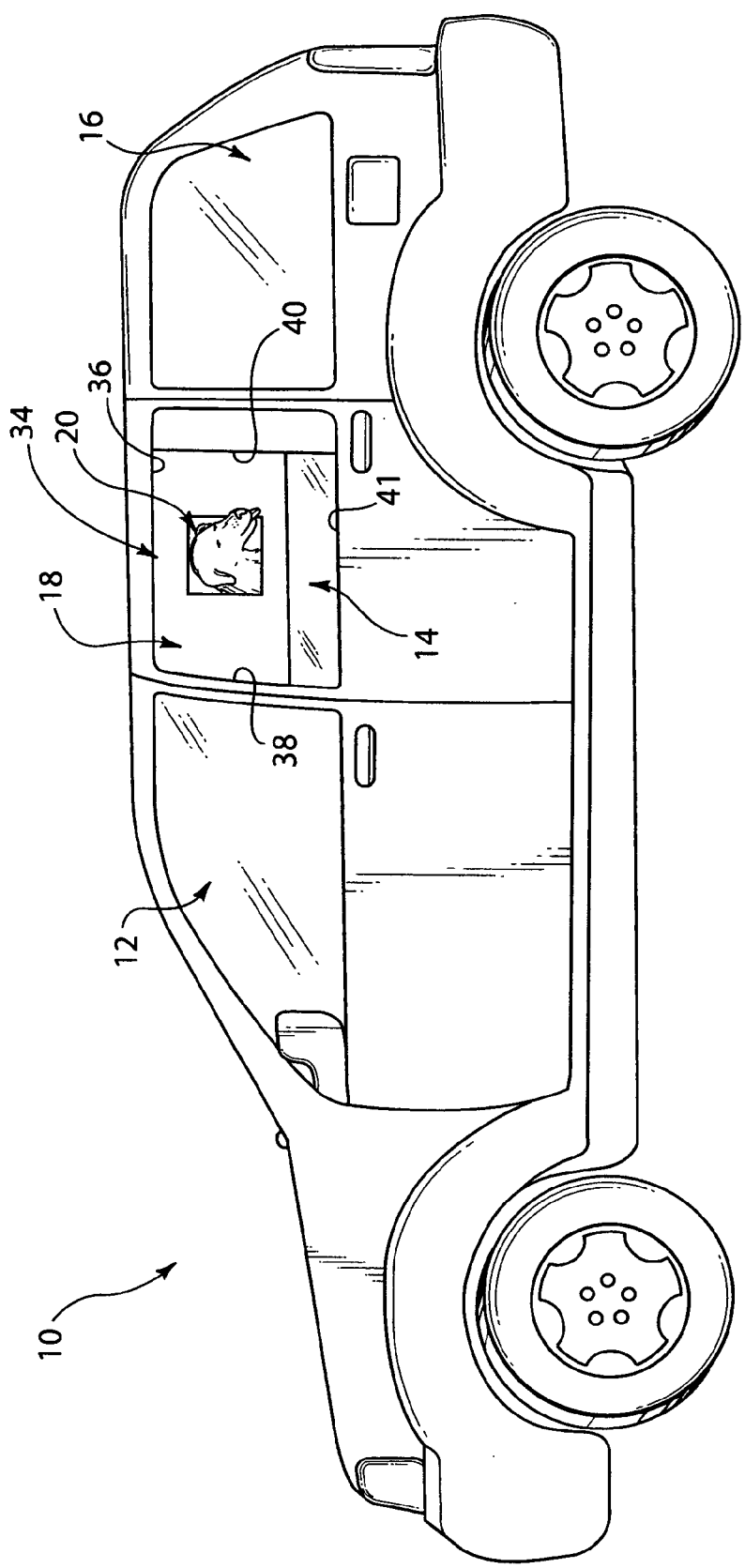
FIG. 1 is a front perspective of an automotive vehicle having a pet ventilation window embodiment constructed in accordance with the present invention installed therein.
Figure 2:
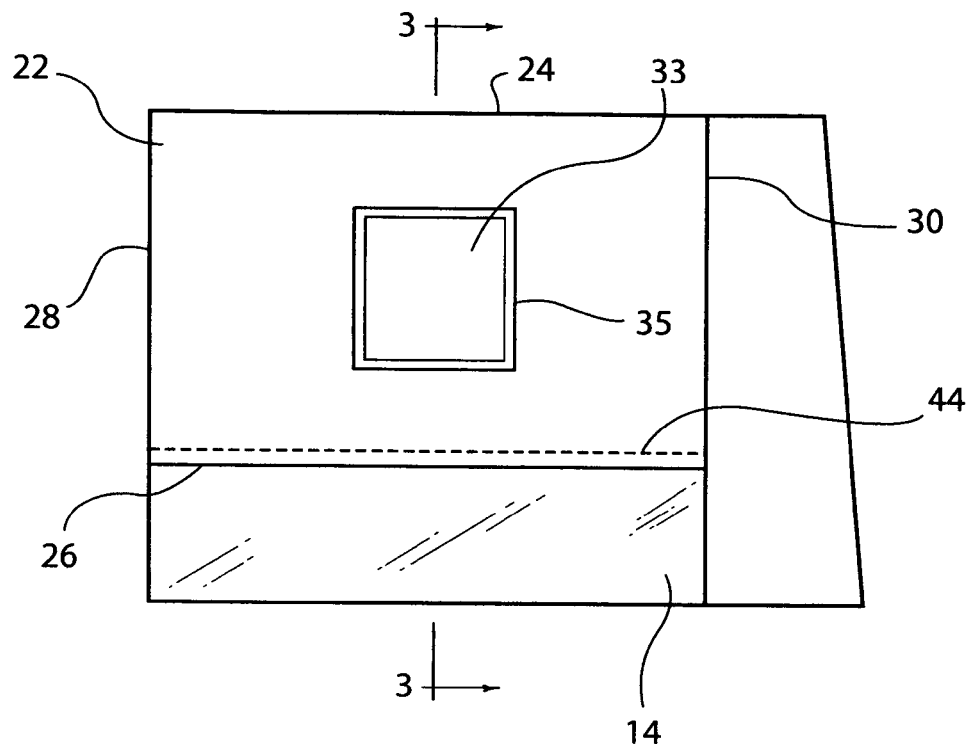
FIG. 2 is a front plan view of one embodiment of the invention in position in a vehicle window frame.
Figure 3:
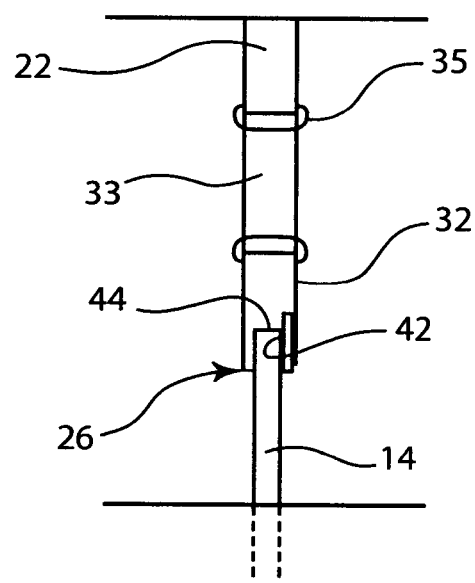
FIG. 3 is a cross-sectional view taken substantially along line 3—3 of FIG. 2.
Figure 9:
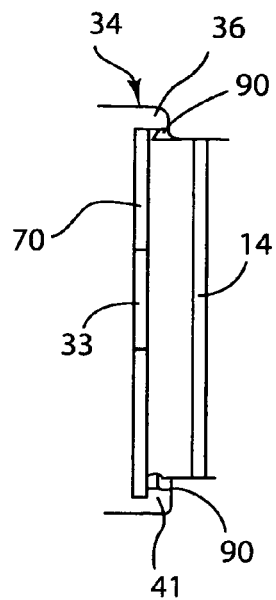
FIG. 9 is a cross-sectional view taken substantially along line 9—9 of FIG. 8.

Referring first to FIGS. 1–3, a vehicle 10 is illustrated having a plurality of side window structures 12, 14 and 16. The present invention is designed to be used with any type of vehicle window structure that includes a retractable windowpane as a part thereof. In this illustrated embodiment, a windowpane 14 is in a partially retracted (or open) position, and a ventilation panel 18 constructed in accordance with the present invention is inserted into the open window frame area created by the partially open or retracted windowpane 14. An opening 33 is defined in the center of the panel 18 as described in greater detail below, and a pet in the form of a dog 20 has its head portion extending or projecting outwardly from the interior of the vehicle 10 through the opening 33.

One preferred embodiment of the invention includes a panel element 22 having an upper edge 24, a lower edge 26, and a pair of opposed side edges 28, 30. The panel element 22 is made from any type of substantially optically transmissive material such as Plexiglas, plastic, glass or the like which can be seen through. In one optional embodiment, the inner surface 32 of the panel element 22 may include a coating of mirrored or reflective material to prevent viewing into the interior of the vehicle from outside of the vehicle 10. The panel element 22 includes an opening 33 in the central portion thereof which is defined by a border element or covering 35 of soft material. The border element 35 protects the neck of the dog or other pet 20 which projects its head through the opening 33. The opening 33 may be any desired size or shape, although rectangular or annular shapes are preferred. The size should be sufficient to enable air to readily pass therethrough as well as enable an average size dog to project its head therethrough without permitting the dog to escape through the opening 33.

In one embodiment of the invention, the panel element 22 is in the form of a single sheet of material which is sized and shaped to fit within the window frame 34. More specifically, the frame 34 includes an upper frame member 36, a pair of opposed side frame members 38, 40, and a lower frame member 41. The panel element 22 is designed so that the upper edge 24 fits within the upper frame member 36, and the side edges 28, 30 fit within the frame members 38, 40, respectively. The lower edge 26 of the panel element 22 preferably includes a substantially U-shaped notch 42 which is sized to snugly fit over the upper edge 44 of the glass windowpane 14. In this manner, the windowpane 14 is retracted fully into the vehicle door to create an open window, and the panel element 22 is then positioned in the frame members 36, 38 and 40. The windowpane 14 is then rolled up and partially closed until the edge 44 of the windowpane 14 engages the notched edge 42 to snugly hold the panel element 22 in position within the window frame 34. In this manner, the panel element 22 is positioned to enable air to readily pass through the opening 33 thereof as well as enable an average size dog to project its head therethrough. The panel element 22 is readily removable in the event it is desired to do so.

In an alternative embodiment illustrated in FIG. 4, the lower edge 28 of the panel element 22 may include a lip member 46 projecting inwardly into the vehicle 10 from the inner surface 48 of the panel element 22. The lip member 46 preferably includes a notched portion 50 similar to the notch 42 of the previous embodiment. The notched portion 50 is sized and shaped to receive the upper edge 44 of the windowpane 14 to firmly hold the panel element 22 in position within the window frame 34.

Referring now to FIGS. 5–6, an alternate embodiment of the present invention is disclosed. In this embodiment, the opening 33' is preferably in the form of a half circle, and the panel element 22 includes a cover member 52 pivotally attached to the outer surface 54 of the panel element 22 by a hinging mechanism 56. The outer surface of the cover member 52 includes a first connection element 58 which is designed to engage a second connection mechanism 60 positioned on the outer surface 54 of the panel element 22. In preferred form, the first and second connection mechanisms 58, 60 are hook and loop fasteners such as Velcro. When these are attached, the cover member 52 is maintained in an open position as illustrated in FIG. 6. A second pair of connection members 62, 64 are positioned, respectively, on the inner surface 66 of the cover member 52 and the outer surface 54 of the panel element 22 below the opening 33. These are also preferable hook and loop fasteners which, when attached, maintain the cover member 52 in its closed position as illustrated in FIG. 5. The open position of the cover member 52 provides an open opening 33' for airflow and pet access. The closed position of the cover member 52 is in the event of inclement weather to close off the opening 33'.

Yet another embodiment is illustrated in FIGS. 7–12. In this embodiment, the panel element 22 is a single sheet of material made from the same material as in the prior embodiments. In this embodiment, the panel element 22 is sized and shaped to fit over the backside of the window frame 34 rather than into the frame members themselves. In this embodiment, a single sheet 70 includes upper, lower and side edges 72, 74, 76 and 78, respectively. The outer surface 80 of the sheet 70 includes connector elements 82, 84, 86 and 88 attached proximate the edges 72, 74, 76 and 78, respectively. The frame members 36, 38, 40 and 41 also include connector elements 90 along the inner surfaces thereof sized and adapted to removably attach to the connector elements 82, 84, 86 and 88 to securely hold the sheet 70 spaced inwardly from the windowpane 14.

Figure 10:
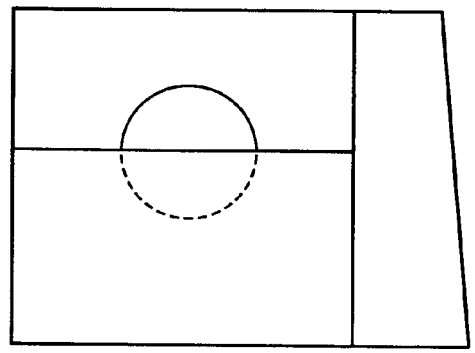
FIG. 10 is a front plan view of a vehicle window frame having the embodiment of FIG. 7 installed therein and the vehicle window in a partially closed position.
Figure 11:
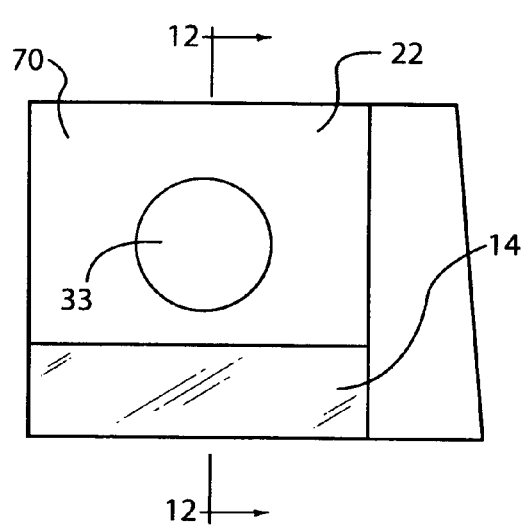
FIG. 11 is a front plan view of a vehicle window frame having the embodiment of FIG. 7 installed therein and the vehicle window in a substantially open position.
Figure 12:
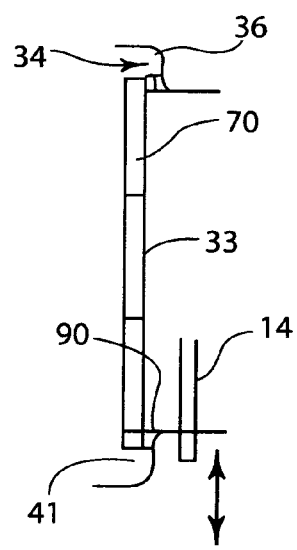
FIG. 12 is a cross-sectional view taken substantially along line 12—12 of FIG. 11.

In this manner, when the windowpane 14 is in its fully rolled up position as illustrated in FIG. 8, the panel element 70 is completely blocked and the opening 33 thereof sealed from the exterior of the vehicle 10. When the windowpane 14 is retracted as illustrated in FIGS. 10 and 11, then the opening 33 is either partially or fully accessed depending on the degree the windowpane 14 is retracted. Thus, the panel element 70 may be in full view and use by rolling the windowpane completely down (FIG. 11), or it may be selectively covered by rolling the windowpane 14 completely up (FIG. 8) as in inclement weather. Moreover, the connector elements 82, 84, 86, 88 and 90 are preferably hook and loop fasteners so that the panel element 70 may be readily attached or removed as desired.

As can be seen from the above, the present invention provides a selectively removable pet ventilation window element. The invention allows air to readily flow through a sizable window opening into a vehicle's interior for comfort of the passengers and any pets contained therein. Moreover, the device of the invention provides ventilation for a pet contained in a parked vehicle without permitting the pet to escape as well as prevents easy access to any door locks by people outside the vehicle. Additionally, the invention enables a pet to extend its head out of the window without providing an avenue of escape by preventing an opening sufficient for the pet's body to pass through. Finally, the invention provides all of the above features without unsightly bars and the like as in the prior art. The invention can also provide full vision through the vehicle windows for the passengers and driver of the vehicle.

The foregoing description and the illustrative embodiments of the present invention have been described in detail in varying modifications and alternate embodiments. It should be understood, however, that the foregoing description of the present invention is exemplary only, and that the scope of the present invention is to be limited to the claims as interpreted in view of the prior art. Moreover, the invention illustratively disclosed herein suitably may be practiced in the absence of any element which is not specifically disclosed herein.

I claim:

1. A pet ventilation panel for a vehicle window having an opening and a retractable window pane movable into and out of the opening, the window opening being defined by a window frame having upper, lower, first and second side frame members with inner and outer surfaces, said ventilation panel comprising:

a selectively removable window cover element formed from a single sheet of material to cover the vehicle window opening along an inner surface of the window frame, said cover element having an upper edge adapted for engaging an inner surface of the window upper frame member, and opposite side edges adapted for engaging inner surfaces of the window first and second side frame members, said cover element being spaced interiorly inwardly of a retractable window pane movable into and out of the opening;

a central opening defined by a continuous edge in said cover element, said opening being sized and shaped to permit penetration thereof by the head of an animal without permitting passage of the animal's body; and a border element covering said central opening continuous edge, said border element protecting the head and neck of an animal which penetrates said central opening.

2. The pet ventilation panel as claimed in claim 1, wherein said window pane functions as a closure mechanism for the central opening in said cover element.

3. The pet ventilation panel as claimed in claim 1, wherein said cover element includes connection elements along said edges to maintain said cover element in position spaced inwardly from the window opening.

4. The pet ventilation panel as claimed in claim 3, wherein said connection elements comprise hook and loop fasteners to removably secure said cover element to the inner surfaces of at least the upper and side frame members of the vehicle window opening.

5. The pet ventilation panel as claimed in claim 1, wherein said removable window cover element further includes a lower edge adapted for engaging an inner surface of the window lower frame member.

* * * * *